(12) United States Patent
Yum et al.

(10) Patent No.: US 9,621,241 B2
(45) Date of Patent: Apr. 11, 2017

(54) METHOD FOR TRANSMITTING CHANNEL STATE INFORMATION AND APPARATUS THEREFOR

(71) Applicant: LG ELECTRONICS INC., Seoul (KR)

(72) Inventors: Kunil Yum, Seoul (KR); Jonghyun Park, Seoul (KR); Bonghoe Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/077,672

(22) Filed: Mar. 22, 2016

(65) Prior Publication Data

US 2016/0285527 A1    Sep. 29, 2016

Related U.S. Application Data

(60) Provisional application No. 62/137,198, filed on Mar. 23, 2015.

(51) Int. Cl.
*H04K 1/10*    (2006.01)
*H04L 27/28*    (2006.01)
*H04B 7/0456*    (2017.01)

(52) U.S. Cl.
CPC .................. *H04B 7/0456* (2013.01)

(58) Field of Classification Search
CPC . H04B 7/0456; H04B 7/0628; H04W 72/042; H04W 72/0446
USPC .......... 375/260, 267, 299, 346, 347
See application file for complete search history.

(56) References Cited

U.S. PATENT DOCUMENTS

2015/0236774 A1*  8/2015  Son ............... H04B 7/0628
                                                  375/267

* cited by examiner

*Primary Examiner* — Phuong Phu
(74) *Attorney, Agent, or Firm* — Lee Hong Degerman Kang Waimey

(57) ABSTRACT

A method for reporting, by a UE, a downlink channel state in a wireless communication system according to an embodiment of the present invention includes: receiving a vertical precoding matrix indicator (PMI) to be used to calculate the downlink channel state; calculating a value of the downlink channel state using the received vertical PMI; and reporting the calculated downlink channel state value to an eNB, wherein the received vertical PMI is used from a later subframe between a subframe in which the vertical PMI is received and a subframe preceding a subframe in which the calculated downlink channel state value is reported by the number of subframes necessary to calculate the downlink channel state value using the received vertical PMI.

7 Claims, 13 Drawing Sheets

FIG. 6

| CIF (3bit) | RA Hdr. | [$N_{RB}^{DL}/P$] | TPC (2bit) | HARQ (3bit) | Scell ID | Modulation order1 (2bit) | NDI1 | RV1 (2bit) | Modulation order2 (2bit) | NDI2 | RV2 (2bit) | VPMI info (2bit) |

FIG. 7

| CIF (3bit) | N_UL_Hop (1 or 2bit) | $\log_2(N_{RB}^{UL} \cdot (N_{RB}^{DL}+1)/2)$ | MCS/RV (5bit) | NDI | TPC (2bit) | DMRS CS (3bit) | CQI req (1 or 2bit) | VPMI info (2bit) | Cont/NCont | A-SRS |

FIG. 8

| CIF (3bit) | N_UL_Hop (1 or 2bit) | [log_2(N_RB^UL·(N_RB^UL+1)/2)] | MCS/RV (5bit) | NDI 1 | TPC (2bit) | DMRS CS (3bit) | CQI req (1 or 2bit) | VPMI set (2bit) | Cont/NCont | A-SRS |

FIG. 9

| CIF (3bit) | RA Hdr. | [N_RB^DL/P] | TPC (2bit) | HARQ (3bit) | Scrib ID | Modulation order1 (2bit) | NDI 1 | RV1 (2bit) | Modulation order2 (2bit) | NDI 2 | RV2 (2bit) | VPMI Conf |

METHOD FOR TRANSMITTING CHANNEL STATE INFORMATION AND APPARATUS THEREFOR

CROSS-REFERENCE TO RELATED APPLICATIONS

Pursuant to 35 U.S.C. §119(e), this application claims the benefit of U.S. Provisional Patent Application No. 62/137,198, filed on Mach 23, 2015, the contents of which are hereby incorporated by reference herein in its entirety.

BACKGROUND OF THE INVENTION

Field of the Invention

The present invention relates to a wireless communication system and, more specifically, to a method for transmitting channel state information and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station (s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method for transmitting channel state information in a wireless communication system in which a two-dimensional antenna structure is used to provide more efficient channel state reporting and suitable signaling according to the method.

The technical problems solved by the present invention are not limited to the above technical problems and those skilled in the art may understand other technical problems from the following description.

According to an embodiment of the present invention, there is provided a method for reporting, by a UE, a downlink channel state in a wireless communication system, including: receiving a vertical precoding matrix indicator (PMI) to be used to calculate the downlink channel state; calculating a value of the downlink channel state using the received vertical PMI; and reporting the calculated downlink channel state value to an eNB, wherein the received vertical PMI is used from a later subframe between a subframe in which the vertical PMI is received and a subframe preceding a subframe in which the calculated downlink channel state value is reported by the number of subframes necessary to calculate the downlink channel state value using the received vertical PMI.

Alternatively or additionally, the number of subframes necessary to calculate the downlink channel state value using the received vertical PMI may be predefined or configured by the eNB.

Alternatively or additionally, the received vertical PMI may be used until an initial reporting of the downlink channel state using the received vertical PMI.

Alternatively or additionally, the received vertical PMI may be used for a predetermined duration or until a predefined event occurs.

Alternatively or additionally, the method may further include calculating a downlink channel state value without a vertical PMI and reporting the downlink channel state value to the eNB when a new vertical PMI to be used to calculate the downlink channel state is not received after the predefined duration or after the predefined event occurs.

Alternatively or additionally, the received vertical PMI may be used until a release message for instructing the received vertical PMI not to be used is received.

Alternatively or additionally, the method may further include receiving a reporting request for the vertical PMI used to calculate the downlink channel state.

Alternatively or additionally, the method may further include reporting the vertical PMI in response to the reporting request, wherein the vertical PMI is reported at all or a part of vertical PMI reporting instances when the reporting request is a request for periodic reporting.

Alternatively or additionally, the method may further include reporting an index of a vertical PMI subset including the vertical PMI according to the reporting request.

According to an embodiment of the present invention, there is provided a UE configured to report a downlink channel state in a wireless communication system, including: a radio frequency (RF) unit; and a processor configured to control the RF unit, wherein the processor is configured to receive a vertical (PMI) to be used to calculate the downlink channel state, to calculate a value of the downlink channel state using the received vertical PMI and to report the calculated downlink channel state value to an eNB, wherein the received vertical PMI is used from a later subframe between a subframe in which the vertical PMI is received and a subframe preceding a subframe in which the calculated downlink channel state value is reported by the number of subframes necessary to calculate the downlink channel state value using the received vertical PMI.

The aforementioned technical solutions are merely parts of embodiments of the present invention and various embodiments in which the technical features of the present invention are reflected can be derived and understood by a person skilled in the art on the basis of the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a downlink control information (DCI) format according to an embodiment of the present invention;

FIG. 7 illustrates a DCI format according to an embodiment of the present invention;

FIG. 8 illustrates a DCI format according to an embodiment of the present invention;

FIG. 9 illustrates a DCI format according to an embodiment of the present invention;

DETAILED DESCRIPTION OF THE INVENTION

Figure 1:
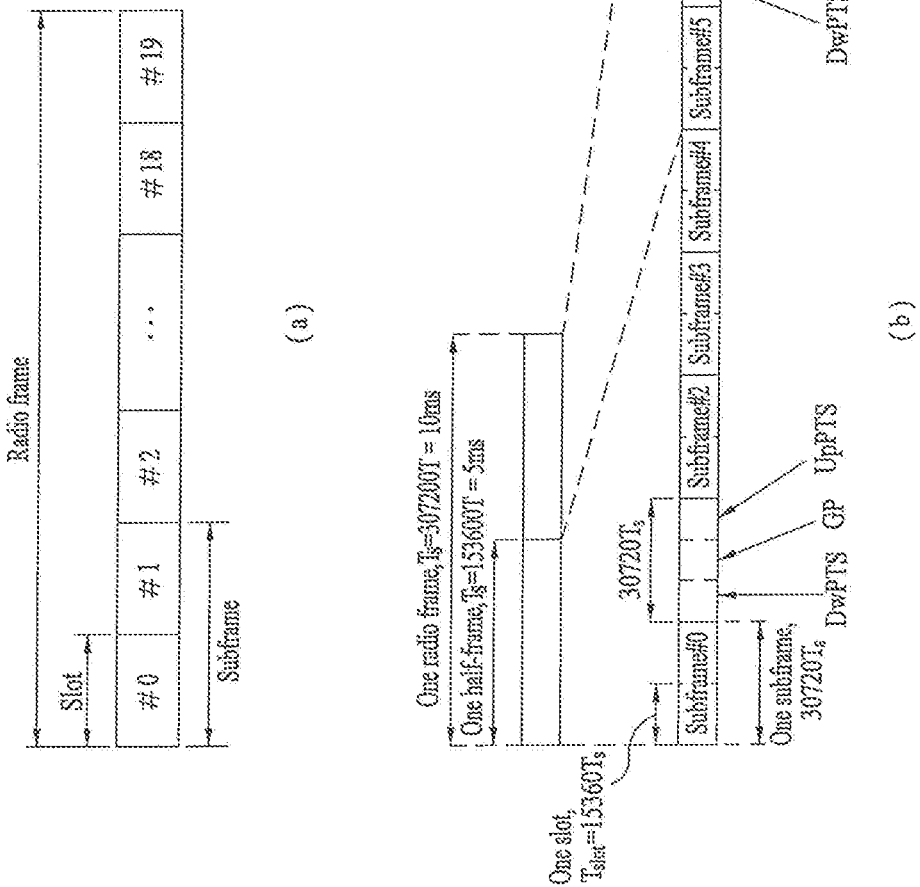
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL Configuration | Downlink-to-Uplink Switch-point periodicity | Subframe number | | | | | | | | |
|---|---|---|---|---|---|---|---|---|---|---|
| 0 | 5 ms | | | | | | | | | |
| 1 | 5 ms | | | | | | | | | |
| 2 | 5 ms | | | | | | | | | |
| 3 | 10 ms | | | | | | | | | |
| 4 | 10 ms | | | | | | | | | |
| 5 | 10 ms | | | | | | | | | |
| 6 | 5 ms | | | | | | | | | |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
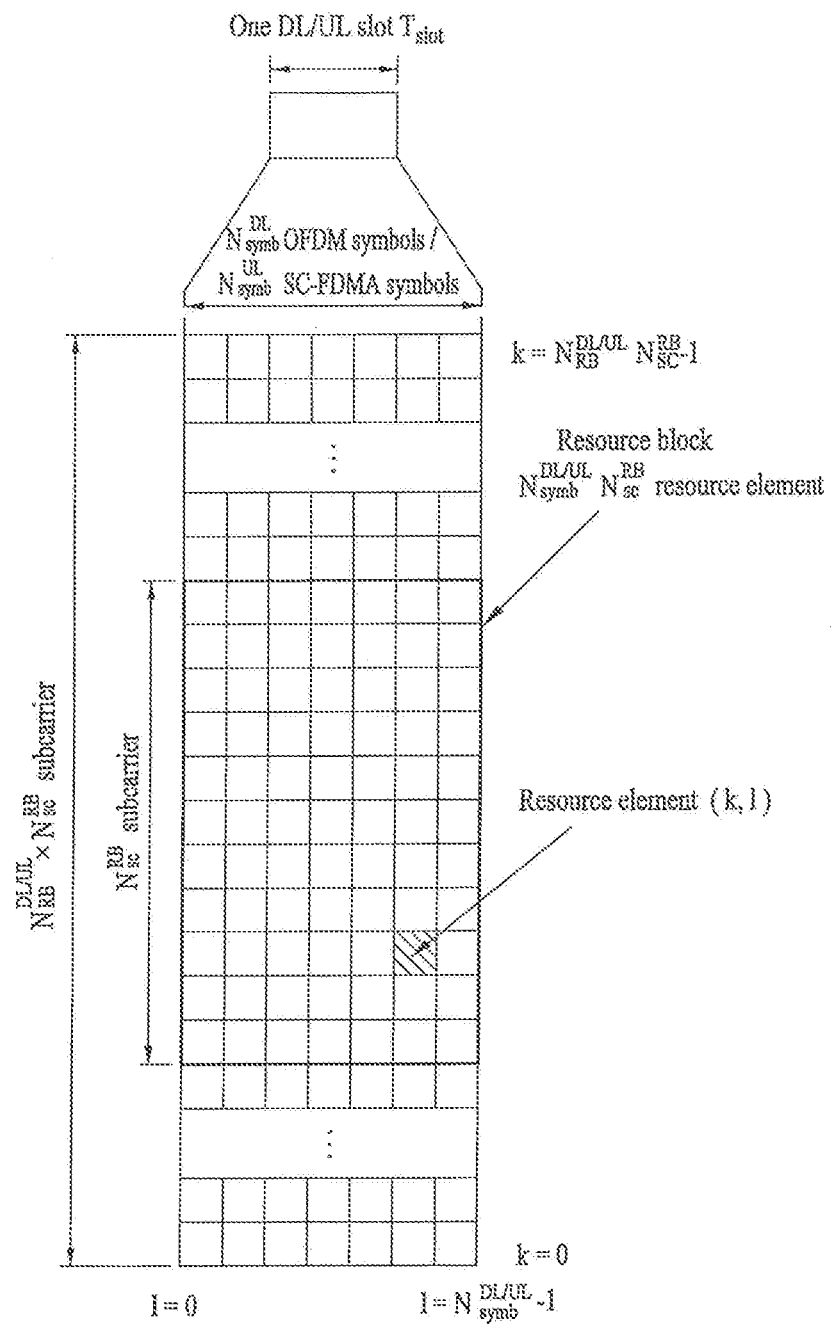
FIG. 2 illustrates an exemplary downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
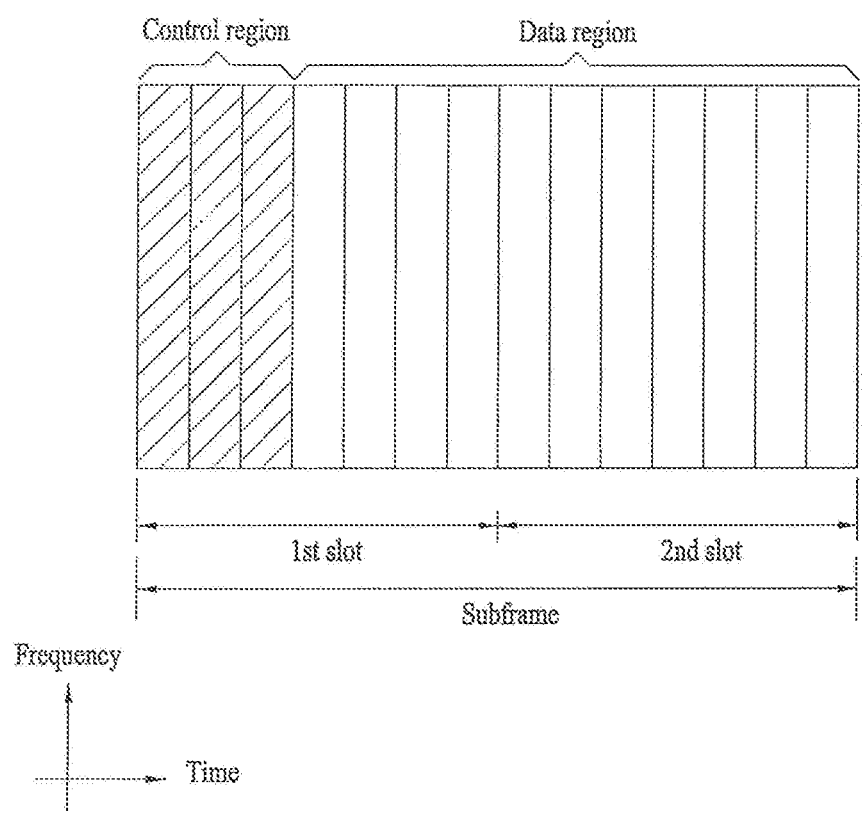
FIG. 3 illustrates an exemplary downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
| --- | --- | --- | --- |
| Type | Aggregation Level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
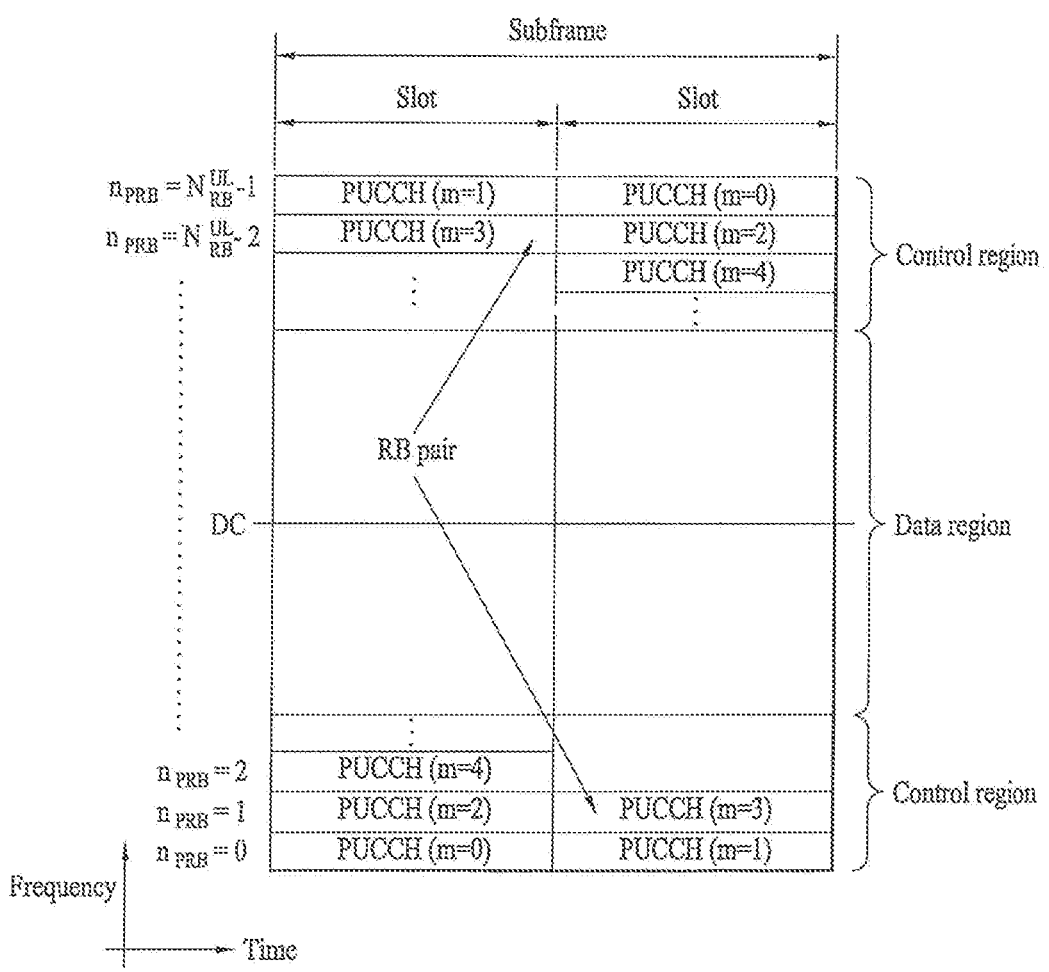
FIG. 4 illustrates an exemplary uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

| | | PMI Feedback Type | | |
| --- | --- | --- | --- | --- |
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N * Subband |

TABLE 6-continued

| | PMI Feedback Type | | |
|---|---|---|---|
| | No PMI | Single PMI | Multiple PMIs |
| UE selected (Subband CQI) | Mode 2-0 RI (only for Open-loop SM) 1st wideband CQI(4 bit) + Best-M CQI(2 bit) (Best-M CQI: average CQI for selected M SB(s) among N SBs) Best-M index (L bit) | | PMI(4 bit) (N is the total # of subbands) (if 8Tx Ant, N * subband W2 + wideband W1) Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N * subband CQI(2 bit) | Mode 3-1 RI 1st wideband CQI(4 bit) + N * subbandCQI(2 bit) 2nd wideband CQI(4 bit) + N * subbandCQI(2 bit) if RI > 1 wideband PMI(4 bit) (if 8Tx Ant, wideband W2 + wideband W1) | Mode 3-2 RI 1st wideband CQI(4 bit) + N * subbandCQI(2 bit) 2nd wideband CQI(4 bit) + N * subbandCQI(2 bit) if RI > 1 N * subband PMI(4 bit) (N is the total # of subbands) (if 8Tx Ant, N * subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth.

The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

Figure 5:
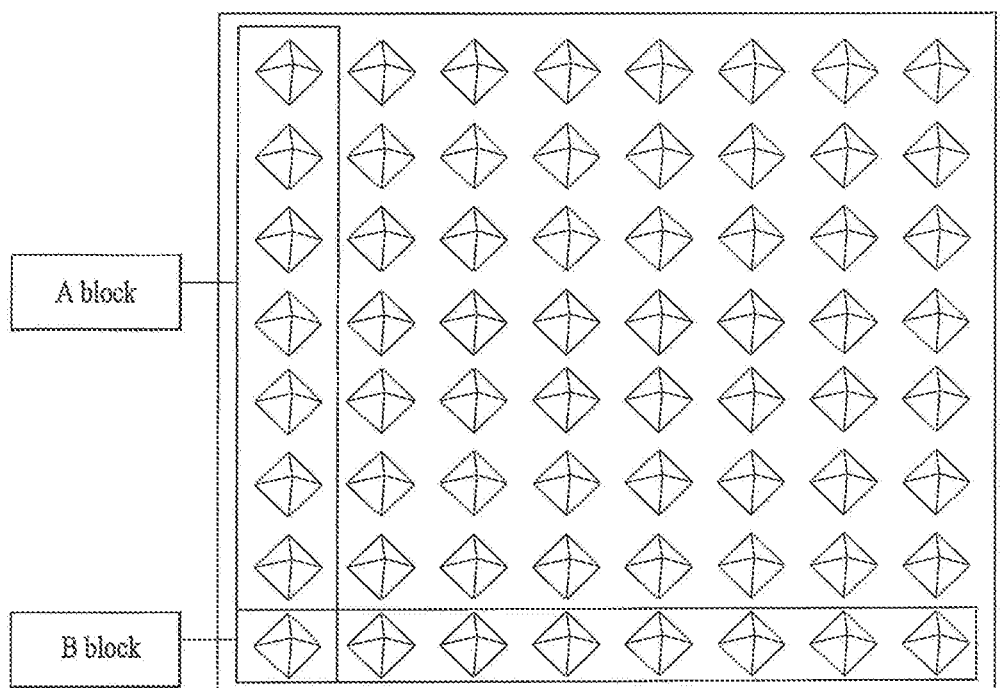
FIG. 5 illustrates a two-dimensional antenna structure.

After LTE Rel-12, an active antenna system (AAS) has been introduced. The AAS is expected to be a technique which is efficiently applicable to reduce interference or to perform beamforming by changing an antenna pattern depending on situation since each antenna of the AAS is configured in the form of an active antenna including an active circuit. When the AAS is constructed two-dimensionally (2D-AAS), it is possible to change a transmission beam more actively according to the position of a receiving end by three-dimensionally controlling the main lobe of an antenna with efficiency in terms of the antenna pattern. Such 2D-AAS is expected to configure an antenna system including a lot of antennas arranged in the vertical and horizontal directions as shown in FIG. 5.

If the 2D-AAS is introduced, a transmitting end needs to transmit a specific RS (e.g. channel state information-reference signal (CSI-RS)) (referred to as "CSI-RS" hereinafter for convenience) in order to inform a receiving end of a channel from the transmitting end to the receiving end, and a UE needs to notify an eNB of information on the corresponding channel such that the eNB can determine precoding to be used for the UE.

In the current LTE system, a preferred PMI of a UE is transmitted by measuring a CSI-RS transmitted from an eNB, and a codebook for horizontal 2tx, 4tx and 8tx systems has been defined. Accordingly, it is necessary to newly define a precoder to be used for the 2D-AAS which assumes eight or more transmitter antenna ports, for channel information feedback of the UE.

However, if a codebook for 64tx 2D-AAS is designed in the manner of designing the codebook of the legacy LTE system, the number of necessary codewords remarkably increases (e.g. 64 bits), resulting in excessive UE complexity increase. Accordingly, in order to avoid the aforementioned situation, a method of separately designing a vertical codebook and a horizontal codebook, generating a precoder using precoders respectively corresponding to the codebooks and using the precoder is considered. For example, it is possible to use a method of independently defining a precoder PV of the vertical codebook and a precoder PH of the horizontal codebook and generating a 2D-precoder P2D using the Kronecker product.

$$P_{2D} = P_V \otimes P_H \quad \text{[Equation 1]}$$

If a codebook is divided into two parts and independently designed, as described above, the number of codewords of each codebook can be reduced. This decreases burden in codebook design and reduces complexity when an eNB/UE uses the corresponding codebook.

For the aforementioned scheme, a PMI, from among the PMI, RI and CQI of CSI feedback, needs to be transmitted as two parts, a horizontal PMI (HPMI) and a vertical PMI (VPMI). When an integrated codebook using two codebooks is employed as described above, a method of calculating one CQI for two PMIs (e.g. HPMI and VPMI) and transmitting the CQI is considered, distinguished from a conventional system based on assumption of one type of precoder (e.g. HPMI) for calculating one CQI. However, it is necessary to define a reference VPMI and HPMI for CQI calculation in order to avoid a situation in which VPMI/HPMI assumption for CQI calculation becomes unclear, such as a case in which a VPMI feedback period is set to be longer than an HPMI/CQI report period. When a UE uses a VPMI which has been transmitted thereby, the UE can use a VPMI/HPMI which has been most recently reported prior to CQI calculation timing. However, when an eNB needs to designate a VPMI which is different from the VPMI received from the UE, for the UE, a problem may be generated. For example, the eNB can use a VPMI other than the VPMI fed back from the UE, for downlink data transmission for the UE in order to schedule a plurality of users. While it is not necessary to know precoding of the eNB since channel estimation using a DM-RS is used for downlink data transmission, the UE needs to be correctly aware of VPMI assumption for CSI calculation for correct CSI calculation and feedback. Accordingly, the VPMI of the eNB needs to be matched to the VPMI of the UE for CSI calculation between the eNB and the UE. To this end, the eNB needs to notify the UE of a VPMI to be used by the UE.

The UE can be informed of a VPMI through the following method according to an embodiment of the present invention.

VPMI Transmission Through DCI

When DCI is used, the eNB can notify the UE of VPMI change per subframe. To this end, a DCI format requires an additional n-bit container for the VPMI.

For example, when a vertical codebook is configured with 2 bits and thus includes 4 precoders, a 2-bit container can be additionally defined in the DCI format to notify the UE of the corresponding VPMI. For convenience, the container is referred to as "VPMI info".

VPMI Transmission Through MAC Signaling

If MAC signaling is used, the eNB can notify the UE of the VPMI using a time delay (20 to 40 ms) longer than the DCI. Since additional CRC check is performed in the case of MAC signaling, MAC signaling can achieve better error protection than the DCI.

VPMI Transmission Through RRC Signaling

The eNB can notify the UE of the VPMI through RRC signaling. Very long delay and more robust error protection are possible through RRC signaling. In this case, the eNB maintains the VPMI of the UE for a very long time, which is an operation similar to vertical sectorization that is a scheme using the 2D-AAS.

The VPMI may be transmitted in the following manner according to another embodiment of the present invention.

Explicit VPMI Indication

The eNB can transmit, to the UE, a VPMI to be actually used by the UE in the eNB. The UE can use the VPMI for not only calculation of CSI such as HPMI/RI/CQI but also receiver operation. A signal for the VPMI can be transmitted using the aforementioned media, for example, DCI, MAC signaling or RRC signaling. For example, the VPMI can be transmitted in such a manner that explicit VPMI indication is transmitted by defining an additional container in a DCI format, as shown in FIG. 6.

VPMI Assumption

The eNB can transmit a VPMI to be used by the UE for CSI calculation. The UE can use the VPMI only for calculation of CSI such as HPMI/RI/CQI and is not expected to use the VPMI for receiver operation. A signal for the VPMI can be transmitted using the aforementioned media, for example, DCI, MAC signaling or RRC signaling. Particularly, the eNB can transmit VPMI assumption along with uplink scheduling DCI (aperiodic CSI request) (e.g., DCI format 0 or 4) and aperiodically receive CSI according to the VPMI assumption. FIG. 7 illustrates an example of signaling a VPMI, which will be assumed during aperiodic CSI calculation, through uplink scheduling DCI. The container "VPMI info" is added as in FIG. 6 to transmit the VPMI assumption.

When the aperiodic CSI request is used as described above, the UE can skip VPMI reporting.

Alternatively, a VPMI assumption set for aperiodic CSI may be set through RRC, and the eNB may notify the UE as to whether one of VPMI assumptions in the VPMI assumption set is used for aperiodic CSI calculation using additional bits of an aperiodic CSI request. The corresponding container is referred to as "VPMI set" for convenience. FIG. 8 illustrates addition of the "VPMI set" container to a DCI format.

VPMI Subset

In the "explicit VPMI indication" and "VPMI assumption", a vertical codebook, instead of a specific VPMI, may be divided into subsets, and the eNB may notify the UE of only an index indicating a subset of a VPMI to be used by the UE. A set of VPMI subsets may be predetermined or set by the eNB for the UE through RRC. The UE can use a representative VPMI set per VPMI subset for calculation of CSI such as HPMI/RI/CQI or determine the best VPMI in each VPMI subset and feed back the VPMI and remaining CSI to which the VPMI has been applied.

VPMI Approval/Rejection

When the UE periodically feeds back a VPMI, the eNB can notify the UE of a VPMI to be used by the UE in such a manner that the eNB approves/refuses the VPMI fed back from the UE at a predetermined time using a 1-bit container of DCI. The UE can calculate CSI such as HPMI/RI/CQI on the assumption that the UE uses the most recently approved VPMI, according to approval/rejection of the VPMI. FIG. 9 illustrates an example of indicating approval/rejection of a VPMI by including a 1-bit "VPMI confirm" container at the end of a DCI format.

When the eNB designates a VPMI for the UE like the aforementioned "explicit VPMI indication", the UE can feed back a best VPMI through periodic VPMI feedback as in the conventional scheme or may not perform VPMI feedback. In the former case, the VPMI fed back by the UE can be used for the eNB to designate a new VPMI instead of being used to calculate the remaining CSI (e.g., HPMI, RI and CQI).

Hereinafter, the "explicit VPMI indication", "VPMI assumption", "VPMI subset" and "VPMI approval/rejection" are all referred to as "VPMI assumption" for convenience.

When the eNB indicates a VPMI to the UE, the VPMI is used as a basic assumption when the remaining CSI is calculated. Particularly, when a method such as MAC signaling is used, a VPMI update instance corresponds to dozens of subframes and thus VPMI error causes errors in the entire CSI for a long time. Accordingly, VPMI integrity check becomes more important than other CSI.

The aforementioned VPMI indication is protected by CRC check of DCI or CRC check of a PDSCH and error protection performed in a higher layer. However, the UE may receive the wrong VPMI and an error in the VPMI may not be detected. This affects a long subframe period, and thus it is desirable to provide a VPMI check process. To this end, the UE can confirm whether a VPMI designated by the eNB has been correctly received by sending periodic feedback about the designated VPMI.

Feedback of an Indicated VPMI Index

The eNB may allow the UE to feed back a VPMI currently used by the UE instead of the best VPMI with respect to an estimated channel of the UE. In this manner, the eNB can confirm whether the UE has properly received a VPMI designated by the eNB.

Periodic Reporting of an Indicated VPMI

The UE can transmit a VPMI set by the eNB in a specific instance from among VPMI feedback instances, for example, at a predetermined interval. In this case, while both periodic best VPMI reporting from the UE and the indicated VPMI can be maintained, a feedback instance for the indicated VPMI may be delayed from the instance in which the eNB designates the VPMI since feedback for the VPMI designated by the eNB can be received only in the specific instance.

Similarly, an indicated VPMI may be reported by setting a new feedback type. In this case, priority of the feedback type for indicated VPMI reporting needs to be set to be higher than feedback type for reporting of other CSI (e.g. HPMI, CQI and the like).

Figure 10:
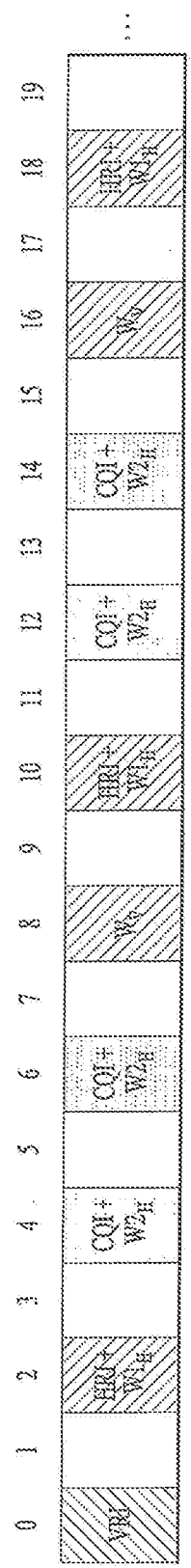
FIG. 10 illustrates a feedback chain according to an embodiment of the present invention.
Figure 11:
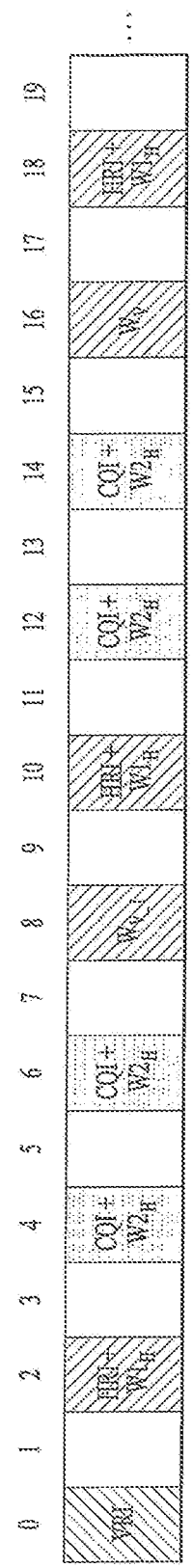
FIG. 11 illustrates a feedback chain according to an embodiment of the present invention.

FIG. 10 illustrates an exemplary feedback chain for feeding back a VRI (vertical RI), an HRI (horizontal RI), HPMIs $W1_H$ and $W2_H$ and a CQI and notifying the eNB of a VPMI $W_V$. Differently from the example of FIG. 10, FIG. 11 illustrates feedback of an indicated VPMI in an odd-numbered instance from among VPMI reporting instances. FIG. 11 illustrates an example in which an indicated VPMI $WV_{V\_I}$ is fed back, instead of the VPMI $W_V$, in the eighth subframe.

Reporting of All Indicated VPMIs

Figure 12:
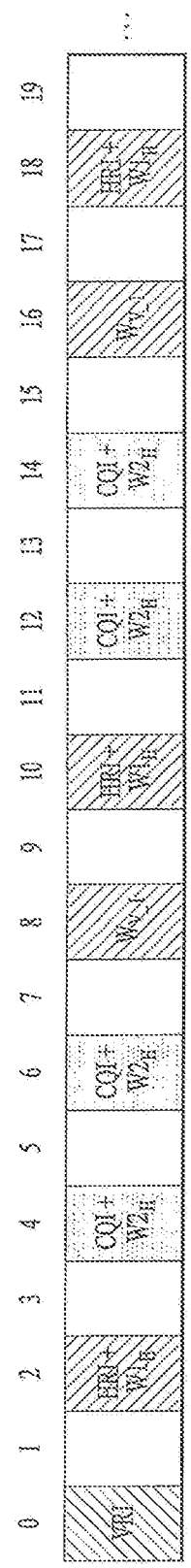
FIG. 12 illustrates a feedback chain according to an embodiment of the present invention.

The UE may feed back a VPMI indicated by the eNB in all VPMI feedback instances. In this case, the eNB may receive a VPMI feedback report using an aperiodic CSI request or switch best VPMI reporting/indicated VPMI reporting modes using DCI. FIG. 12 illustrates an example of transmitting an indicated VPMI from the eNB in all VPMI feedback instances.

Feedback of a VPMI Codebook Subset Index

A VPMI codebook subset index, instead of a VMPI codebook index, may be transmitted. This scheme can reduce uplink feedback overhead, compared to the aforementioned scheme, and transmit the VPMI along with a container of CSI other than the VPMI instead of an additional container. However, the indicated VPMI cannot be confirmed.

Alternatively, the eNB may check a VPMI assumed/used by the UE by sending an aperiodic CSI request to the UE. To this end, the UE can feed back the VPMI indicated by the eNB along with a best VPMI for an estimated channel measured thereby.

Alternatively, the UE may feed back the indicated VPMI designated by the eNB, instead of the best VPMI. To this end, the eNB can include an indicated VMPI feedback indicator in the aperiodic CSI request and send the aperiodic CSI request including the indicator to the UE. The indicator is included in uplink scheduling DCI. The indicator may be included in a separate container of the uplink scheduling DCI, or one of states indicated by a corresponding bit field may be allocated to "indicated VPMI report request" when the aforementioned VPMI info or VPMI set is used.

TABLE 8

| VP MI info | Message |
|---|---|
| 0 to 2 | VPMI assumption, VPMI index 0~2, respectively |
| 3 | indicated VPMI report |

Table 8 shows VMPI info when one of the states indicated by VMPI info is allocated to indicated VPMI report when an aperiodic CSI request is transmitted using DCI, as shown in FIG. 7. In this case, indices 0 to 2 indicate VMPI assumption and respectively indicate specific VPMIs. The UE feeds back aperiodic CSI assuming the corresponding VPMIs to the eNB upon reception of indices 0 to 2. In the above example shown in Table 8, the VPMIs corresponding to indices 0 to 2 are related to aperiodic CSI reporting only and are used by the UE for aperiodic CSI reporting only. In the above example, index 3 is related to periodic CSI reporting and indicates reporting of CSI including the VPMI indicated by the eNB to the UE. Alternatively, the UE may transmit the indicated VPMI instead of the best VPMI.

In this case, the eNB can perform uplink scheduling after k subframes and the UE can transmit an aperiodic report of CSI including the indicated VPMI in the corresponding subframe upon reception of VPMI assumption. Here, k, which represents CSI calculation time, may be predefined or set by the eNB for the UE through RRC.

Matching between VPMI info indices indicating VPMI assumption, such as indices 0 to 2 in Table 8, and VPMI indices may be predefined, or the eNB may notify the UE of the matching through RRC. In this case, VPMI subset indices may be allocated instead of VPMI indices.

Alternatively, "indicated aperiodic VPMI request" instead of the aperiodic CSI request may be defined. The eNB may transmit the indicated aperiodic VPMI request to the UE and the UE may notify the eNB of only the indicated VPMI through a PUSCH upon reception of the indicated aperiodic VPMI request.

In addition, the eNB may set priority of VPMI assumption for the UE. For example, the eNB can inform the UE as to whether application of corresponding VPMI assumption is mandatory or recommended through RRC. The UE must apply the corresponding VPMI in the former case. In the latter case, the UE may use corresponding VPMI assumption as much as possible (e.g. within SINR/throughput within a threshold) and transmit the best PMI thereof and CSI using the corresponding VPMI in other cases.

To set periodic CSI reporting, it is necessary to align VPMI assumption indication and timing of actually applying a corresponding command.

Even though VPMI assumption has arrived at subframe #n through DCI, an actual periodic CSI report to which the VPMI assumption has been applied is fed back at subframe n+k since k subframes (for example, when carrier aggregation is not applied, k=4) are necessary to calculate CSI using the corresponding VPMI. Accordingly, it is necessary to clearly define timing at which the corresponding VPMI assumption is applied to calculation of each piece of CSI.

Figure 13:
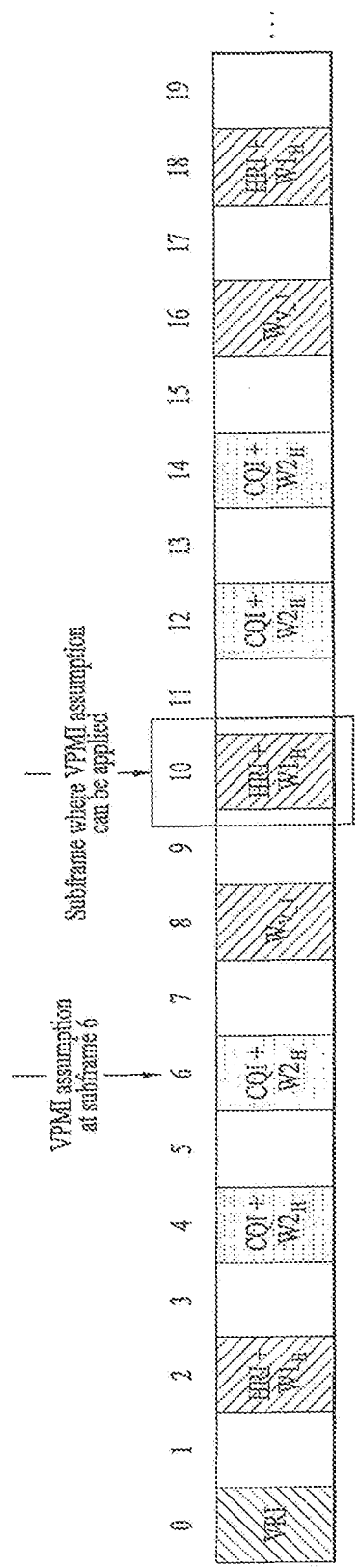
FIG. 13 illustrates a feedback chain according to an embodiment of the present invention.

FIG. 13 illustrates a case in which VPMI assumption is received at subframe #6 (i.e. n=6) when a VPMI indicated by the eNB is reported in all VPMI feedback instances. In this case, if k=4, CSI using the VPMI assumption can be acquired from subframe #10. The UE can feed back VPMI assumption, which has been received at subframe #6, at subframe #8 although subframe #8 has an index smaller than n+k since additional calculation is not necessary and feedback of the current VPMI assumption is significant.

In addition, application of VPMI assumption considering a feedback instance of specific CSI (e.g. RI and VPMI) may be considered since calculation of each CSI element (e.g. RI, VPMI, HPMI or CQI) is affected by different CSI elements in addition to the VPMI assumption. For example, CSI to which VPMI assumption has been applied can be considered to be fed back from the initial VPMI feedback instance of the VPMI after the subframe at which the VPMI assumption is received. In this case, the same operation as feedback of the actual VPMI can be performed, and thus the overall operation is unaffected.

Particularly, considering a term for CSI calculation, if a VPMI feedback instance corresponds to subframe #p, the initial CSI feedback instance to which VPMI assumption is applied will be a subframe after subframe #max(p, n+k). In this case, since n+k=6+4=10 and the initial VPMI reporting instance after VPMI assumption reception corresponds to subframe #8 in the example of FIG. 13, it can be assumed that CSI to which the corresponding VPMI has been applied is fed back from subframe #10 corresponding to max(8, 10)=10. Accordingly, CSI to which the VPMI assumption received at subframe #6 has been applied corresponds to CSI after HRI+W1$_H$ of subframe #10 in the example of FIG. 13. For feedback of the CSI to which the VPMI assumption has been applied from the corresponding subframe, the UE needs to use the VPMI assumption to calculate CSI after the instance satisfying max(p−k, n). That is, the UE needs to apply the indicated VPMI assumption to CSI calculation performed from subframe #6 corresponding to max(8−4, 6)=6 in the example of FIG. 13.

Figure 14:
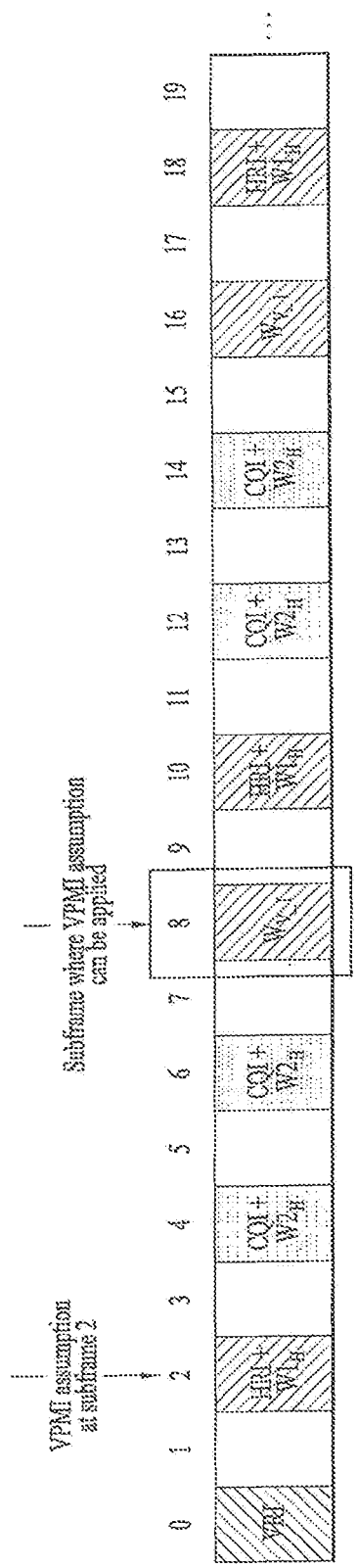
FIG. 14 illustrates a feedback chain according to an embodiment of the present invention.

FIG. 14 illustrates a case in which VPMI assumption is received in an instance different from the instance shown in FIG. 13. In this case, n=2 and p=9 (k=4 as in the above example) and thus max(8, 2+4)=8. Accordingly, CSI transmitted after subframe #8 corresponds to CSI to which VPMI assumption received at subframe #2 has been applied. In this case, the UE needs to apply the VPMI assumption to CSI calculated from subframe #4 corresponding to max(8−4, 2)=4. Therefore, CSI to which the VPMI assumption has been applied is CSI after HRI+W1$_H$ of subframe #10 in FIG. 14.

In the above example, CSI transmitted between subframe #n and subframe #n+k is CSI to which the VPMI assumption has not been applied, and thus this CSI may be dropped as necessary.

The value k is a term for CSI calculation and may be predefined or set by the eNB for the UE through RRC.

Alternatively, CSI feedback may be based on RI transmission instances instead of VPMI assumption reception instances. This scheme has an advantage of performing better CSI estimation since all CSI elements are calculated by obtaining a rank to which new VPMI assumption is applied. However, VPMI assumption application timing may be excessively delayed due to a long RI feedback period. It is possible to perform the corresponding operation by setting a subframe index corresponding to a subframe at which p=RI is fed back while using the aforementioned process.

Alternatively, the eNB may directly designate an instance in which a VPMI is used or applied, for the UE through RRC or DCI.

After application of VPMI assumption as described above, it is necessary to define instances in which the VPMI assumption is used between the eNB and the UE.

One-Shot

VPMI assumption is applied only to a subframe at which the UE receives the VPMI assumption or subframes which are designated such that the VPMI assumption will be applied thereto according to an embodiment of the present invention. The present embodiment is valid when the VPMI assumption is transmitted through DCI, particularly. When the UE receives DCI including the VPMI assumption, the UE can apply the VPMI assumption to the subframe at which the DCI is received or to CSI initially calculated after the subframe. The initially calculated CSI may be a single piece of CSI (e.g. CQI) or may refer to an instance in which a single CSI set (RI, HPMI and CQI) is calculated/transmitted by applying the VPMI assumption thereto.

Start—Duration Structure

VPMI assumption may be applied for predetermined duration after the UE receives the VPMI assumption according to an embodiment of the present invention. The UE calculates CSI to which the VPMI assumption has been applied for predetermined duration from when the VPMI assumption is applied, and the eNB assumes that the CSI to which the VPMI assumption has been applied is transmitted for the predetermined duration in consideration of CSI calculation time and feedback instance. If new VPMI assumption is not transmitted after the duration, the UE can calculate/transmit CSI to which VPMI assumption has not been applied. For example, if there are 10 subframes for VPMI assumption duration, the UE can calculate CSI to which the VPMI assumption has been applied, for 10 subframes from when the VMPI assumption is received, and feed back the CSI to the eNB. Alternatively, the UE may apply the corresponding VPMI to CSI calculated for 10 subframes from actual VPMI assumption application timing considering specific VPMI reporting timing and feed back the CSI to the eNB, as described above. The eNB may assume that the VPMI assumption has been applied to CSI received for 10 subframes from when first CSI to which the VPMI assumption has been applied is received.

For the VPMI assumption duration, time such as a subframe and a unit corresponding thereto may be used. The duration may be applied to an instance in which a specific event is generated or to an instance in which a specific event is repeated a predetermined number of times, such as an instance in which specific CSI reporting is fed back n times. The VPMI assumption duration may be predefined or signaled by the eNB to the UE through RRC.

Release

According to an embodiment, when the eNB wants the UE, which has fed back CSI to which VPMI assumption has been applied, to feed back CSI to which no VPMI assumption has been applied, the eNB may transmit a VPMI assumption release message to the UE such that the UE does not use the VPMI assumption. The UE may apply the next VPMI assumption or VPMI assumption set before the VPMI assumption release message is received.

The release message may be transmitted through the same scheme/media as the VPMI assumption. For example, when media such as DCI is used, the following release message can be set.

TABLE 9

| VPMI info | Message |
| --- | --- |
| 0 | Release/no assumption |
| 1 | VPMI assumption 1 |
| 2 | VPMI assumption 2 |
| 3 | VPMI assumption 3 |

When the UE receives "0" through "VPMI info" container, the UE deletes VPMI assumption used so far if the VPMI assumption is present and calculates/transmits CSI without VPMI assumption.

The aforementioned embodiments with respect to instances in which VPMI assumption can be applied or used may be used independently or two or more thereof may be simultaneously used. For example, VPMI assumption can be applied until VPMI assumption duration expires or the release message is received by using both the VPMI assumption duration and the release message.

While the VPMI has been exemplified in the aforementioned embodiments for convenience, the embodiments may be applied to a scenario in which one or more of multiple dimensions are fixed and PMIs of the remaining dimensions are transmitted, such as an HPMI case.

Even when the RI is divided into a VRI and an HRI, the RI can be transmitted/used using the aforementioned scheme. Particularly, rank information can be included in VPMI info and the RI and VPMI can be simultaneously transmitted using indices of VPMI info.

Figure 15:
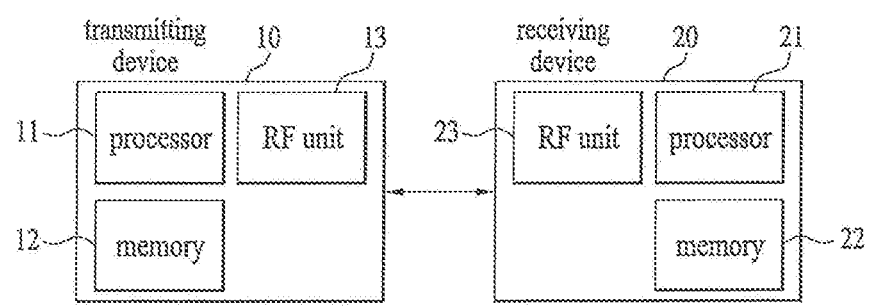
FIG. 15 is a block diagram of an apparatus for implementing embodiments of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reporting, by a user equipment, a downlink channel state in a wireless communication using a 2-dimensional active antenna system (2D-AAS) including antennas arranged in vertical and horizontal directions, the method comprising:

receiving, by the user equipment from a base station, a first vertical precoding matrix indicator (PMI) about a vertical direction of the 2D-AAS in a first subframe;

determining, by the user equipment, whether to use the first vertical PMI to acquire the downlink channel state based on a receiving timing of the first vertical PMI and a reporting timing of the downlink channel state;

acquiring, by the user equipment, a value of the downlink channel state about a horizontal direction of the 2D-AAS; and reporting, by the user equipment to the base station, the acquired downlink channel state value in a second subframe, wherein the acquiring comprises:

calculating, by the user equipment, the downlink channel state value using the first vertical PMI when the second subframe is within a predetermined duration from the first subframe; and calculating, by the user equipment, the downlink channel state value without using the first vertical PMI when the second subframe is over the predetermined duration from the first subframe.

2. The method according to claim 1, further comprising calculating a downlink channel state value without using the first vertical PMI and reporting the downlink channel state value to the base station when a new vertical PMI to be used to acquire the downlink channel state is not received after the predefined duration.

3. The method according to claim 1, wherein the first vertical PMI is used until a release message for instructing the first vertical PMI not to be used is received.

4. The method according to claim 1, further comprising receiving a reporting request for a vertical PMI used to acquire the downlink channel state.

5. The method according to claim 4, further comprising reporting the vertical PMI in response to the reporting request, wherein the vertical PMI is reported at all or a part of vertical PMI reporting instances when the reporting request is a request for periodic reporting.

6. The method according to claim 4, further comprising reporting an index of a vertical PMI subset including the vertical PMI according to the reporting request.

7. A user equipment configured to report a downlink channel state in a wireless communication using a 2-dimensional active antenna system (2D-AAS) including antennas arranged in vertical and horizontal directions, comprising:

a radio frequency (RF) unit; and a processor configured to control the RF unit, wherein the processor is configured to receive, using the RF unit, a first vertical precoding matrix indicator (PMI) about a vertical direction of the 2D-AAS in a first subframe from a base station, determine whether to use the first vertical PMI to acquire the downlink channel state based on a receiving timing of the first vertical PMI and a reporting timing of the downlink channel state, acquire a value of the downlink channel state about a horizontal direction of the 2D-AAS, and report, using the RF unit, the acquired downlink channel state value in a second subframe to the base station, wherein the downlink channel state value is calculated using the first vertical PMI when the second subframe is within a predetermined duration from the first subframe, and wherein the downlink channel state value is calculated without using the first vertical PMI when the second subframe is over the predetermined duration from the first subframe.

* * * * *